United States Patent [19]

Price et al.

[11] 4,195,318
[45] Mar. 25, 1980

[54] HIGH DENSITY BIAS LINEARIZED MAGNETIC RECORDING SYSTEM UTILIZING NYQUIST BANDWIDTH PARTIAL RESPONSE TRANSMISSION

[75] Inventors: Robert Price, Lexington; John W. Craig, Sudbury, both of Mass.; Avraham Perahia, Simi Valley, Calif.; Hartvig E. Melbye, Wayland, Mass.

[73] Assignee: Sperry Corporation, New York, N.Y.

[21] Appl. No.: 888,130

[22] Filed: Mar. 20, 1978

[51] Int. Cl.² .................................................. G11B 5/09
[52] U.S. Cl. ...................................................... 360/39
[58] Field of Search .................. 360/25, 39, 40, 68, 360/65; 325/38 A

[56] References Cited

U.S. PATENT DOCUMENTS

| | | | |
|---|---|---|---|
| 3,388,330 | 6/1968 | Kretzmer | 325/38 A |
| 3,492,578 | 1/1970 | Gerrish et al. | 325/38 A |
| 3,573,622 | 4/1971 | Holzman et al. | 325/38 A |
| 3,601,702 | 3/1971 | Lender | 325/38 A |
| 3,665,485 | 5/1972 | Pear, Jr. | 360/40 |
| 3,679,977 | 7/1972 | Howson | 325/38 A |
| 3,736,414 | 5/1973 | McAuliffe | 325/38 A |
| 3,840,891 | 10/1974 | Hellwarth | 360/40 |
| 3,855,616 | 12/1974 | Schneider | 360/40 |
| 3,921,210 | 11/1975 | Halpern | 360/40 |
| 3,947,767 | 3/1976 | Koike et al. | 325/38 A |
| 3,952,329 | 4/1976 | Dent et al. | 360/40 |

OTHER PUBLICATIONS

"Application of Partial-response Channel Coding to Mag. Recording Systems"–Kobayashi et al., IBM J. Res. Dev. 7/70, "Tradeoffs among Binary Codes in Mag. Tape Cassettes"–Pastoriza, Computer Design/-Jan. 76.

Primary Examiner—Vincent P. Canney
Attorney, Agent, or Firm—Howard P. Terry; Albert B. Cooper

[57] ABSTRACT

A digital magnetic recording system is disclosed that utilizes partial response signalling to achieve the Nyquist data pulse rate with minimum bandwidth. A. C. bias is introduced to linearize the magnetic medium which, inter alis, permits reliable multilevel (greater than 2) data storage without impairing data accessibility. Preferably Class IV partial response is utilized with one or more sinusoidal lobes in the data frequency spectrum. The basic binary data to be stored is converted to, for example, ternary and the ternary data is precoded. The precoded ternary data is recorded on the magnetic medium via an interleaved dipulse sequence having a spectral null slightly outside the data frequency band. A pilot tone is inserted at the spectral null for timing recovery and automatic gain control.

44 Claims, 10 Drawing Figures

HIGH DENSITY BIAS LINEARIZED MAGNETIC RECORDING SYSTEM UTILIZING NYQUIST BANDWIDTH PARTIAL RESPONSE TRANSMISSION

BACKGROUND OF THE INVENTION

1. Field of the Invention

The invention relates to high density digital magnetic storage systems of the type generally utilized for computer bulk storage. Magnetic disk storage systems utilizing non-contact recording and readback typify such systems.

2. Description of the Prior Art

Present day non-contact digital magnetic bulk storage systems utilize saturated-flux recording in combination with run-length limited codes for reducing cost per written information bit while enlarging the on-line capacity of the storage systems. Such codes, although alleviating the problems (inherent in recording of random data) of loss of timing clock and interference between flux transistions, operate at the cost of requiring the recording of a larger number of code bits than corresponding data bits. Multilevel recording (using greater than two levels) is not utilized to increase data storage density since the inherently non-linear characteristic of the magnetic interface does not reliably permit this recording format in general. Specifically, however, ternary recording would be possible in a non-linear channel by utilizing as the three states, positive saturation, negative saturation and zero flux. Since the zero flux level of ternary recording would not erase the previously recorded data, overwriting by new data would then require either a time consuming erase cycle or an additional erase transducer. For various reasons a separate erase transducer has been unfeasible in disk files. It is furthermore appreciated that communication theory indicates that contemporary commercial systems have not yet achieved bit densities that approach the theoretical limit propounded by Nyquist.

Independently of the above, partial response signalling has been developed for increasing the data rate capacity of communication channels such as telephone transmission systems. Partial response data transmission is disclosed in such U.S. Pat. Nos. as 3,388,330 issued June 11, 1968 entitled "Partial Response Multilevel Data System" and Pat. 3,492,578 issued Jan. 27, 1970 entitled "Multilevel Partial-Response Data Transmission". Although partial response has been considered for utilization in digital magnetic storage systems, heretofore this signalling technique has been contemplated as applying to storage systems utilizing saturated flux recording. It is believed that these systems considered in the prior art would be subject to timing recovery difficulties; and if multilevel recording were attempted, better automatic gain control than that of contemporary practice would be needed, and in any event the problem discussed above of old data erasure would be prevalent.

Additionally, in such prior art systems difficulties would be encountered in shaping the channel frequency spectral response to partial response signalling, particularly with respect to Class IV partial response which would be one of the more useful classes of partial response signalling in that it permits achieving the Nyquist rate with minimum channel bandwidth. Since partial response signalling requires linearly combining pulses in the data stream for precisely and accurately controlled intersymbol interference, the saturated non-linearity of the magnetic interface as aggravated at high data densities would tend to distort the partial response data combinations rendering meaningful data recovery difficult if not impossible.

Thus it is appreciated from the foregoing that the prior art applications of partial response signalling to magnetic medium storage systems, as far as the binary data to be stored is concerned, are limited to a binary data rate equal to the Nyquist pulse rate for minimum bandwidth saturated flux recording systems. It is appreciated that if, as discussed above, ternary amplitude pulses are recorded utilizing positive saturation, zero flux and negative saturation to represent the ternary levels and thereby achieving 50 percent increase in binary data rate utilizing the bandwidth afforded by the magnetic interface, a separate erase cycle or separate erase tranducer would be required to erase the old data. Either of these erase techniques is very unattractive in commercial disk storage systems.

SUMMARY OF THE INVENTION

The invention contemplates utilizing a bias signal to linearize the magnetic interface in a digital data storage system operating on a magnetic medium with partial response signalling. Preferably Class IV partial response is utilized wherein the transfer function of the system is shaped so that the data pulse frequency spectrum has one sinusoidal lobe, or in an extended Class IV partial response system, multiple sinusoidal lobes. The bias permits the utilization of a pilot tone for precise timing recovery independently of the data, and likewise for accurate, automatic, data-independent gain control to alleviate the adverse effects of multiplicative distortions (such as variations in flying height of the head) of the channel. Additionally, the channel linearized by the bias permits non-saturation recording of multilevel pulses such as ternary and quaternary which significantly increases the system information storage density along the track. In other words, the information transfer rate per Hertz of bandwidth is now significantly increased while still adhering to a minimum Nyquist bandwidth system. The bias signal as well as linearizing the channel additionally erases the old data simultaneously with the writing of the new data thereby eliminating the practical difficulties discussed above. The linearizing of the channel by the bias also facilitates purity of channel shaping for the Class IV partial response as well as the inclusion of record side preemphasis for enhancement of signal to noise ratio, where the latter has largely been unattainable in commercial disk files.

The preferred embodiment of the invention additionally translates the data into a novel interleaved dipulse sequence for generating the recording signal. This arrangement provides a spectral null slightly above the data frequency band for the insertion of the pilot tone.

It is expected that prior art attempts at utilizing minimum-bandwidth partial response in digital magnetic recording systems would be unsuccessful for high lineal recording density because the non-linearities of the magnetic interface would tend to distort the proper linear combinations of the pulse amplitudes required in partial response signalling. By the utilization of linearizing alternating current bias with partial response signalling, a lineal recording density four times greater than that provided in the prior art under similar magnetic interface constraints has been achieved.

DESCRIPTION OF THE PREFERRED EMBODIMENT

The preferred embodiment of the invention is contemplated for application to a magnetic disk file for computer bulk storage. It is appreciated that this situs is merely exemplary, the concepts of the invention being applicable to any magnetic recording and read back channel. Communication theory indicates that significantly greater basic binary information densities along the recording track, than have heretofore been achieved in commercially procurable disk files, are theoretically potentially available in non-contact disk recording systems. The digital magnetic recording system of the present invention has advanced performance considerably beyond the prior art toward such ultimate lineal bit densities and has achieved factors of three to four increase in reliable density over contemporary, state of the art commercial products. In order to achieve this significant increase in lineal bit density, partial response signalling was utilized. Although this signalling configuration had in the past been considered for use in magnetic recording channels, it is believed that such applications had been contemplated only for the saturated flux recording format. Furthermore, it is believed that because of the non-linearities inherent in the magnetic interface such attempts would not have been successful for high lineal bit densities.

Accordingly, the present invention utilizes, for example, a bias field created by a very high frequency alternating current for linearizing the magnetic interface, thus achieving reliable performance improvement in utilizing for the first time non-saturated flux recording with partial response signalling.

The use of bias additionally provides simultaneous, low-noise erasure of old data as new data is written. The linearized interface permits insertion of a pilot tone for timing recovery and automatic gain control. The linearized medium also permits multi-level recording, thus significantly increasing the information storage density. Furthermore, the linearized medium conveniently permits both write-side and read-side equalization, filtering, preemphasis and channel shaping for enhancing the read back signal to noise ratio of the partial response signalling format without aggravating distortion.

Figure 1:
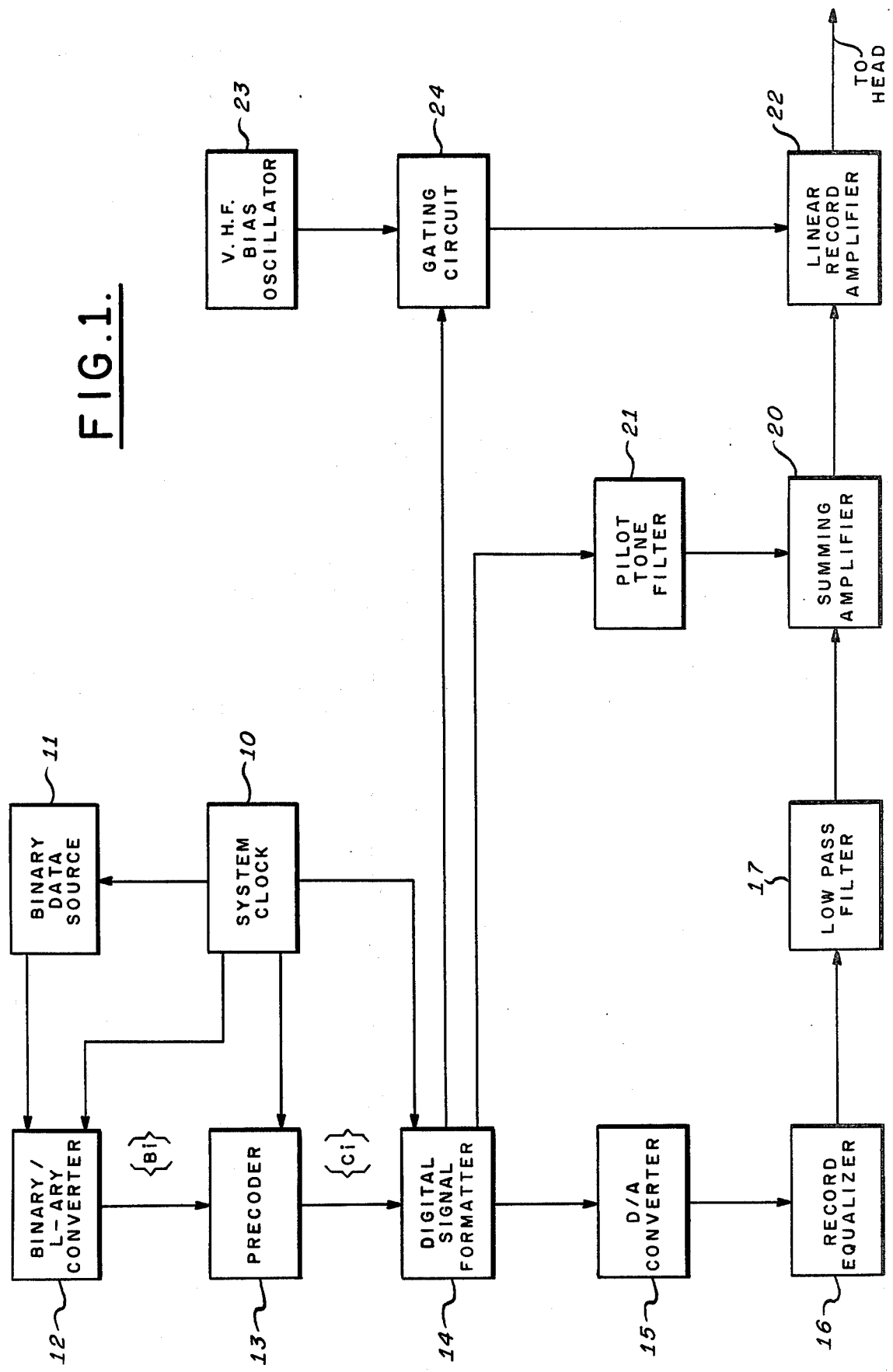
FIG. 1 is a schematic block diagram of the recording portion of the digital magnetic recording system of the present invention.
Figure 4:
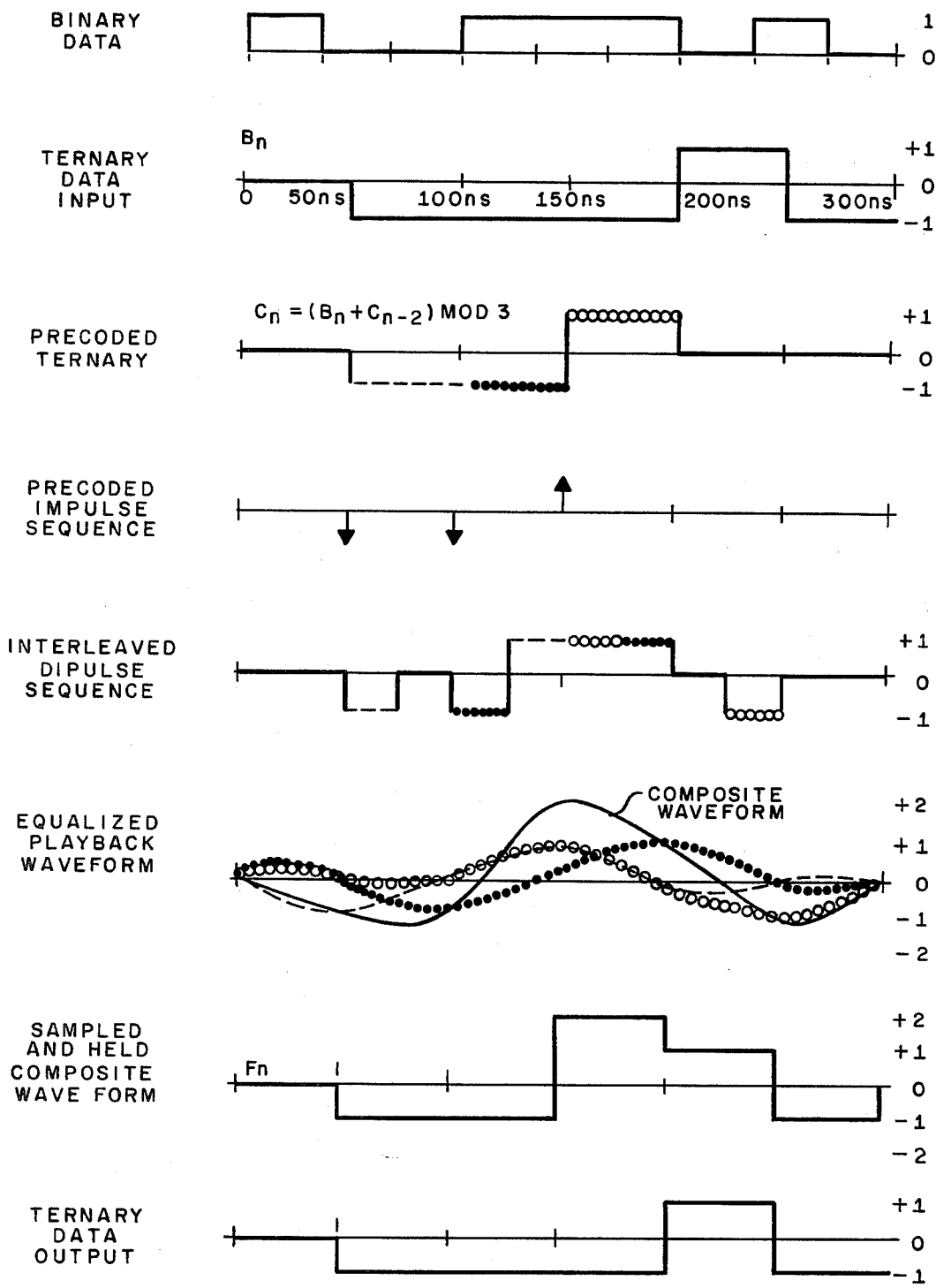
FIG. 4 is a diagram of waveforms useful in explaining the operation of the system of the present invention.

Referring to FIG. 1, a schematic block diagram of the recording portion of the system of the present invention is illustrated. The record or write side electronics is controlled by a system clock 10 which in the present embodiment comprises an 80 MHz crystal clock. Binary data to be recorded on the medium is provided by a binary data source 11 which is synchronized by the system clock 10. Typical binary data provided by the source 11 are illustrated in FIG. 4 as indicated by the legend.

The binary data from the source 11 is converted into equivalent multilevel data in a binary to L-ary converter 12. It is appreciated that the binary data may be converted into data having any number of levels that can reliably be recorded on the magnetic interface and recovered therefrom utilizing the partial response signalling arrangement of the system. It is furthermore appreciated that the present invention could be implemented with two level recording and in this arrangement the converter 12 would not be utilized. In the illustrated embodiment a binary-to-ternary converter was employed for mapping groups of three binary digits representative of eight states into two ternary amplitude pulses representative of nine states, one of which is not utilized. The converter 12 provides a unique mapping of binary data into ternary data. FIG. 4 illustrates the ternary data provided by the converter 12 in response to the binary sequence illustrated in the figure.

The ternary data is provided at a rate of 20 million pulses per second with the corresponding binary data being provided at a rate of 30 Mbits/sec. Thus in the illustrated embodiment the binary data having two levels, for example, 1 and 0, are converted into ternary data having three levels, for example, +1, 0 and −1. The conversion process performed by the converter 12 is synchronized by the system clock 10. Any suitable design for the binary-to-ternary converter 12 may be utilized in practicing the present invention, such converters being commonly employed in conventional partial response communication channels.

In the present embodiment each ternary output pulse from the converter 12 is represented by a parallel pair of binary digits. Thus the binary input sequence is uniquely converted into a sequence of parallel pairs of binary digits representative of the converted ternary data. In the preferred embodiment of the invention the ternary data may be recorded with non-saturated flux although it is appreciated that ternary data is compatible with saturated recording (utilizing plus and minus flux saturation and zero flux) and could be utilized herein since the bias provides simultaneous erasure of previous data.

For convenience, the ternary pulse sequence output from the converter 12 may be denoted as $\{B_i\}$ with the individual ternary pulses of the sequence denoted as $B_n$.

In partial response signalling systems it is generally known that the input data should be precoded to prevent the propagation of errors in the decision circuits operating on the received or playback pulse sequence. Accordingly, the ternary pulse output from the converter 12 is applied as an input to a precoder 13 which is synchronized in operation by the system clock 10.

The precoder 13 in turn provides the precoded ternary pulse sequence $\{C_i\}$. The sequence $\{B_i\}$ is modulo precoded in accordance with the rule for Class IV partial response signalling as follows:

$$C_n = (B_n + C_{n-2}) \bmod L$$

where L is the modulus of the multilevel data. In the present ternary embodiment the precoding equation is $$C_n = (B_n + C_{n-2}) \bmod 3$$

The values in the modular set of ternary elements are here taken to be $(-1, 0, +1)$. FIG. 4 illustrates the precoded ternary data corresponding to the ternary sequence $\{B_i\}$ exemplified in the Figure. The pulses in the various clock intervals illustrated are identified by various line types (dots, dashes and circles) for purposes of explanation.

It is appreciated that numerous precoding circuits are known in the partial response art. In the present embodiment the sequence of parallel pairs of binary digits representative of the ternary pulses is applied as the input to the precoder 13 which performs the modulo 3 arithmetic set forth above to provide the precoded ternary pulse sequence as further parallel pairs of binary digits representative thereof. The output pulse rate from the precoder 13 is 20 Mpulses/sec.

The precoded ternary data, still thus represented in binary, is applied as an input to a digital signal formatter 14 which is synchronized from the system clock 10. The digital signal formatter 14 is utilized to gate the recording bias signal, generate a pilot tone and format the data into a recording signal. The digital formatted data is converted to a recording signal via a conventional digital-to-analog converter 15 which accepts the previously precoded parallel pairs of binary digits and converts them into the ternary pulses which they represent. The total recording current is the sum of three components which may be designated as information bearing signal, pilot tone, and bias. The pilot tone and bias components of the recording current will be later discussed. The information bearing signal component is comprised of three successive sections designated as sync, preamble and data. In the sync interval the signal is a 5 MHz sine wave that is synchronous with the 20 MHz data time base and is utilized to resolve a phase ambiguity in the playback timing recovery circuitry in a manner to be described. The preamble interval may be any predetermined fixed pulse pattern to provide a flag for the start of data. It will be appreciated that conventional circuits within the formatter 14 generate the digital representation of the sync and preamble signals which are time multiplexed with the digital precoded ternary data as represented by parallel binary pairs from the precoder 13.

The digital signal formatter 14 in combination with the digital-to-analog converter 15 provides the information bearing signal for recording as an interleaved dipulse sequence. The formatter 14 provides control signals to the converter 15 whereby each non-zero valued ternary pulse in each 50 nanosecond clock interval is decomposed into a pair of 25 nanosecond wide sub-pulses extending beyond the clock interval, which is termed an interleaved dipulse. The first sub-pulse of each dipulse is of the same polarity as the corresponding precoded ternary data pulse and occurs in the first half of the clock cycle in which the ternary pulse occurs. The second sub-pulse of the dipulse is also 25 nanoseconds wide and has the same absolute magnitude as the first sub-pulse but is of opposite polarity with respect thereto, the second sub-pulse occurring in the latter half of the next occurring clock interval of 50 nanoseconds.

Figure 3:
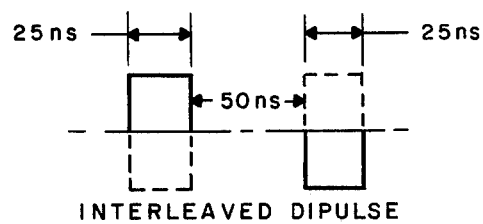
FIG. 3 is a waveform diagram of the interleaved dipulse signal utilized in the system of the present invention.
Figure 6:
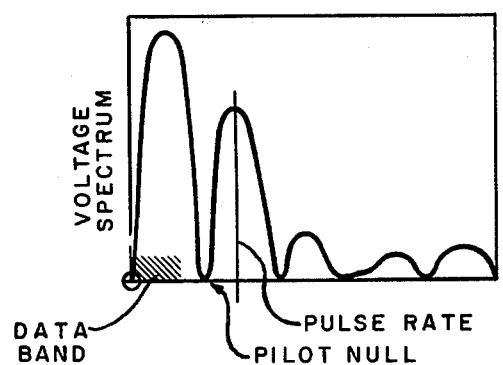
FIG. 6 is a diagram of the frequency spectrum of the interleaved dipulse sequence utilized in the system of the present invention.

FIG. 3 illustrates the generic and novel interleaved dipulse into which each of the 50 nanosecond precoded ternary pulses is decomposed, when the latter is of non-zero magnitude. The polarity of each of the sub-pulses of the dipulse is selected in accordance with the polarity of the ternary pulse as described; when the ternary pulse is identically zero in conveying the data, the dipulse is then correspondingly identically zero and the sub-pulses are caused to vanish. FIG. 4 depicts the interleaved dipulse sequence resulting from the exemplary precoded ternary sequence illustrated, and it will be appreciated that the interleaved dipulse can equally well be binary, quaternary or L-level modulated should it be required in other appropriate embodiments of the invention. The lines shown as dashes, dots and circles identify the particular dipulse resulting from the similarly identified precoded ternary pulse. The voltage spectrum of the interleaved dipulse sequence is illustrated in FIG. 6 indicating that the signal has no d.c. component and has an enhanced high frequency content within the constraint imposed by the spectral null, thus reducing requirements for high frequency preemphasis circuitry in the Nyquist data band. Above this band, the frequency spectrum rolls off to a convenient null for the insertion of the pilot tone. Furthermore, it is appreciated from FIG. 4 that the dipulses interleave, or "nest" in such manner that the resulting sequence has the same number of levels as the precoded multilevel pulse sequence from which it is immediately derived. This is advantageous in the details of the generation of the interleaved dipulse sequence which will be discussed below with respect to FIGS. 9 and 10. More generally in data transmission systems such as those employing a coaxial cable channel, the said "nesting" feature facilitates the utilization of a non-linear transmitter for maximum power output concentrated in the minimum Nyquist data band, when binary or multilevel partial response signalling is employed. In so applying the interleaved dipulse feature of the invention it may be conceived that a major advantage lies in its enhanced high frequency content for improved signal to noise ratio with respect to channel attenuation of high frequencies rather than in its spectral null, in which case a pilot tone may or may not be concurrently employed. When a pilot tone is not utilized the timing and automatic gain control may be recovered from the data itself, in a manner well known to the art but causing somewhat of a decrease in the effective data transmission rate.

With reference to FIG. 4, it is convenient to conceptualize the generation of the interleaved dipulse sequence as follows: firstly the precoded ternary sequence $\{C_i\}$ multiplies a periodic sequence of unit impulses of period 50 nanoseconds to produce the precoded impulse sequence illustrated. The precoded impulse sequence is convolved with the interleaved dipulse of FIG. 3 to generate the illustrated interleaved dipulse sequence of FIG. 4. It is appreciated that the apparatus does not actually utilize this procedure which is described to facilitate the understanding of the operation of the invention.

Although the present embodiment is described in terms of utilizing an interleaved dipulse, it will be appreciated that the precoded multilevel signal, exemplified as precoded ternary in FIG. 4, could be directly utilized for recording via the digital-to-analog converter 15 eliminating the interleaved dipulse format. In this case a data spectrum null for insertion of the pilot tone could be provided by the low pass filter 17 in FIG. 1.

Figure 7:
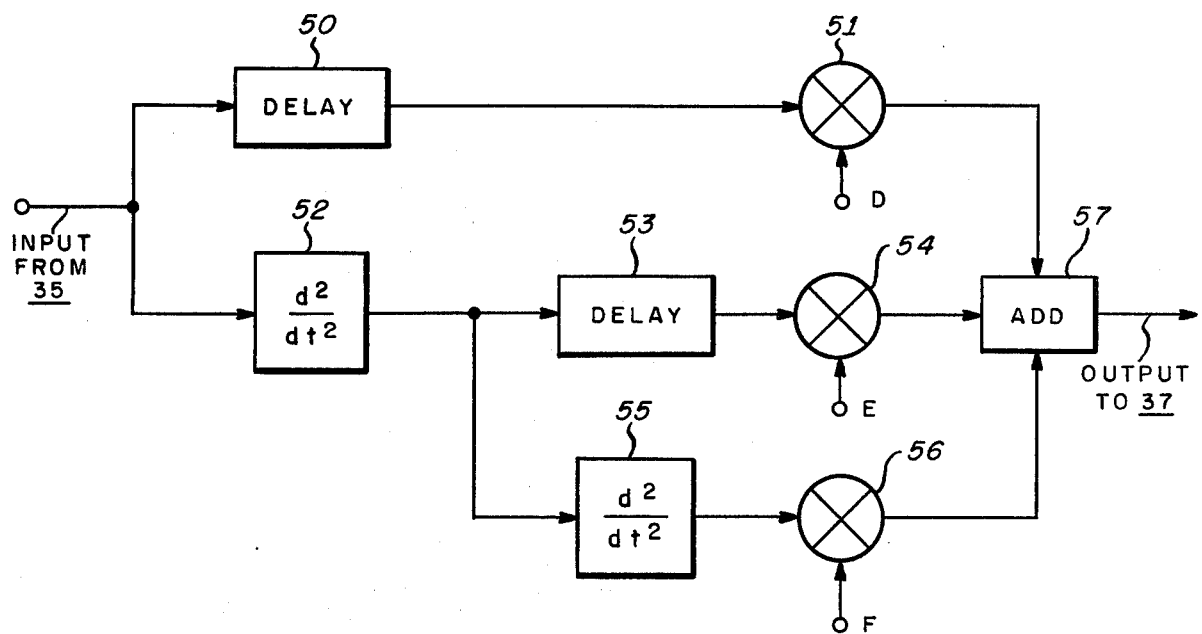
FIG. 7 is a schematic block diagram of the derivative equalizer of FIG. 2.

The output from the converter 15 is applied through a recording equalizer 16 and the low pass filter 17 as an input to a summing amplifier 20. The recording equalizer 16 compensates for interface losses by applying low frequency and high frequency preemphasis or boost. In the present embodiment the low frequency and high frequency preemphasis or boost is applied below and above 2 MHz respectively. The recording equalizer 16 may be implemented as an approximation, to within a nearly linear phase vs radian frequency $\omega$, of the transfer function equation:

$$\text{OUTPUT/INPUT} = -i(A/\omega - B\omega + C\omega^3),$$

where $i = \sqrt{-1}$ by a conventional network resembling that of FIG. 7, into which electronic signal integration is introduced. It will be appreciated that in conventional saturated binary magnetic recording systems such equalization is not possible because of the non-linear interface. By the novel combination effected in the present invention the write side equalization may be utilized for a significant increase in signal-to-noise ratio, by best dividing the total required shaping of the system transfer function between the write-side equalization and that of the read back. The filter 17 is a linear phase low pass filter that greatly attenuates high frequency components, for example, above 12.5 MHz, to prevent the generation of undesired (0-10 MHz) intermodulation products during the recording process.

Circuitry included within the digital signal formatter 14 generates a square wave in response to the system clock 10 at the frequency of the pilot tone which in the present embodiment is 13⅓ MHz. A filter 21 extracts the fundamental of the pilot tone square wave providing the sinusoidal pilot tone which is phase coherent with the sync, preamble and data. The pilot tone from the filter 21 is added to the output of filter 17 in the amplifier 20.

The output of the summing amplifier 20 is applied as an input to a linear recording amplifier 22 which combines the bias signal with the data and pilot tone. The bias component may, for example, be a 38.5 MHz sine wave provided by a crystal oscillator 23. The bias need not be phase coherent with the information bearing signal and the pilot tone components, but should be of a sufficiently high frequency and level that any residual non-linearity of the recording medium causes little distortion in the equalized playback waveform (even for worst case data patterns). The bias signal is applied to the amplifier 22 via a gating circuit 24 which gates the bias under control of a signal from the digital signal formatter 14 when it is required during the recording interval. The output of the recording amplifier 22 is applied to the head for recording on the medium. It is appreciated that the gated bias signal may, alternatively, be amplified separately from the linear amplification of the output of the summing amplifier, with the resulting output currents then being summed in the recording head.

Figure 2:
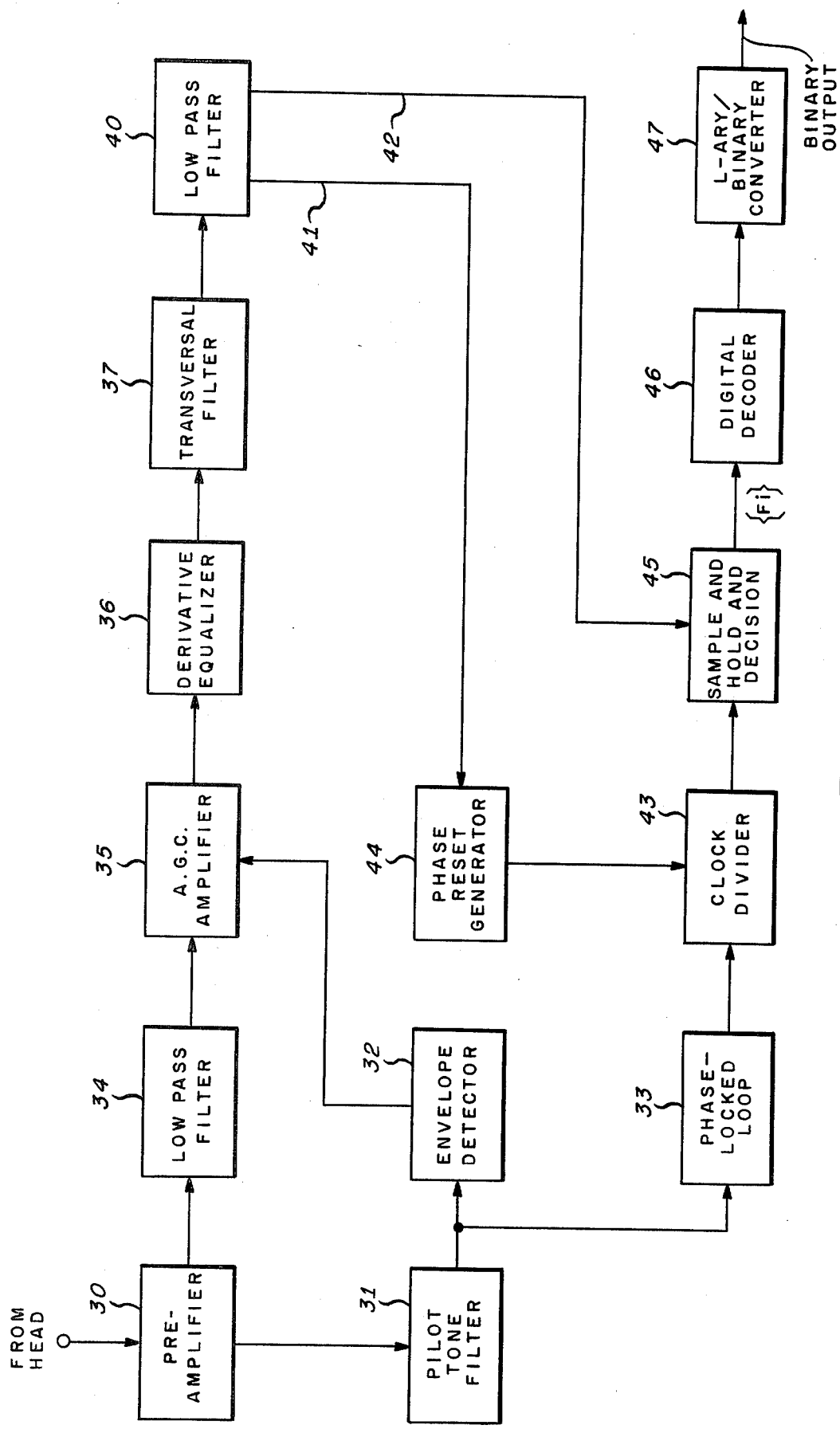
FIG. 2 is a schematic block diagram of the read back portion of the digital magnetic recording system of the present invention.

Referring to FIG. 2, a schematic block diagram of the readside electronics of the present embodiment of the magnetic recording system of the present invention is illustrated. The upper row of components depicts the analog data-signal processing portion of the read back circuitry and the lower row of components performs the system timing recovery, sampling and decision and logical conversion back to binary data. The read back signal from the head is applied to a preamplifier 30. The pilot tone component is extracted from the read back signal by a pilot tone filter 31 which applies the pilot tone to an envelope detector 32 for automatic gain control purposes and to a phase locked loop 33 for system timing recovery. The circuit 32 is a conventional envelope detector that provides a signal in accordance with the recovered envelope of the recorded pilot tone. Thus it is appreciated that as system gain variations occur such as resulting from variations in head flying height, the amplitude of the envelope signal varies in direct proportion to the gain variations experienced at the 13⅓ MHz pilot tone frequency.

The preamplifier 30 provides the read back data signal to a low pass filter 34 which has a flat pass band with linear phase and is utilized, in the present system, to attenuate spectral components above 18 MHz so that later processing does not add significant noise or cause non-linearity.

The filtered signal is applied to an automatic gain control (AGC) amplifier 35 which receives a gain control input from the envelope detector 32. It was determined in the present system that gain variations in decibels (dB) of the interface are substantially proportional to frequency over a wide bandwidth. This system behavior is believed to result primarily from flying height variations of the head. The ideal gain control to offset such frequency dependent gain fluctuations would be exceedingly complicated and therefore in the present embodiment a simpler AGC is utilized. This is feasible since in the present embodiment, although the signal energy extends from 0 to 10 MHz, the signal energy is dominant in the vicinity of 5 MHz for Class IV partial response operation. Additionally, the required gain changes are small. Therefore the AGC amplifier 35 utilizes a gain control function for the entire signal which is correct for 5 MHz thereby providing a good approximation to the ideal wide band gain control. The AGC amplifier 35 utilizes a gain control law:

$$C_1 X^{-C_2}$$

where X is the input to the amplifier 35 from the envelope detector 32. Thus it is appreciated that the amplifier 35 provides the desired gain control inversely as a power law of the variations in pilot tone envelope whose exponent is $C_2$. The positive constants $C_1$ and $C_2$ are adjusted in accordance with specific system parameters, $C_1$ being any number convenient to AGC implementation. The exponent $C_2$ is selected in accordance with the experimentally derivable ratio, in this case (13⅓)/5 = 8/3, between the dB gain variation occurring at the pilot tone frequency, which in the present embodiment is 13⅓ MHz, and that occurring at the center of the data band, which in the present embodiment is 5 MHz.

The signal output from the AGC amplifier 35 is passed through a derivative equalizer 36 and a transversal filter 37 to provide spectral shaping and phase correction. These components are utilized to shape the spectrum of the signal to the desired Class IV partial response contour with linear phase. The derivative equalizer 36 has a transfer function which approximates to within a nearly linear phase vs radian frequency $\omega$:

OUTPUT/INPUT = $(D - E\omega^2 = F\omega^4)$ with the coefficients D, E, and F adjusted in accordance with system parameters so as to compensate for changes in the transfer function of the interface arising from track-to-track changes in wavelength at any given frequency $\omega$. The derivative equalizer 36 compensates for the short wavelength interface losses and radius effects. A recorded frequency sweep may be utilized to adjust the coefficients D, E and F so that the output of the device in response to the frequency sweep provides a flat frequency response. Further details of the conventional network comprising the derivative equalizer 36 will be provided below with respect to FIG. 7.

Figure 5:
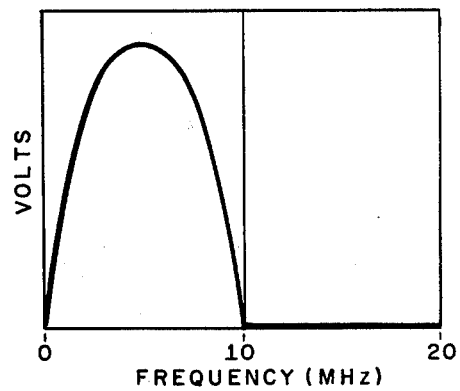
FIG. 5 is a diagram of the frequency spectrum of a data pulse shaped in the system of the present invention in accordance with Class IV partial response signalling.

The transversal filter 37 provides amplitude and phase equalization or spectral shaping. The filter 37 provides equalization from 0 to 20 MHz to within a frequency resolution of approximately 1½ MHz. The transversal filter 37 is adjusted so that the data pulses transmitted through the channel are rendered into the proper Class IV partial response shape as illustrated in FIG. 5. The circuit permits correction to both the amplitude and phase response of the system in a manner well known to the art. Details of the transversal filter 37 regarding its structure and adjustment will be given below with respect to FIG. 8.

The Class IV partial response spectrum of FIG. 5 is ideally a one-half sinusoidal lobe from 0 to 10 MHz, i.e., sin $[\omega/(2\cdot 10^7)]$, and vanishes above 10 MHz. It will be appreciated that alternative embodiments might be utilized within the purview of the invention having a partial response frequency spectrum comprising two or more sinusoidal lobes. For example, two sinusoidal lobes may be utilized from 0 to 10 MHz with a null at 5 MHz for insertion of a pilot tone. Alternatively one sinusoidal lobe may be utilized in accordance with Class IV partial response but with the pilot tone inserted at the 10 MHz band edge null.

The output from the transversal filter 37 is applied to a low pass filter 40 which is the system final filter having a flat, linear phase pass band to 10 MHz and which attenuates input components above 11 MHz. The circuit 40 also includes a filter tuned to 5 MHz for providing the previously discussed sync signal on a line 41 for reasons to be later described. The filtered and equalized data pulse signal is provided on a line 42 and is illustrated in FIG. 4 as the equalized playback waveform. The specific composite waveform illustrated is comprised of the pulse components indicated by the curves composed of dots, dashes and circles corresponding to the similarly identified interleaved dipulse sequence components resulting from the precoded ternary data pulses as discussed above. It will be appreciated that the digital signal formatter 14 controls the digital-to-analog converter 15 to provide the interleaved dipulse as described above; and the equalizers and filters 16, 17, 34, 36, 37 and 40 preemphasize, equalize and shape the data pulse frequency spectrum so as to provide, in cascade with the linearized magnetic interface, a close approximation to the ideal Class IV sinusoidal spectral shape of FIG. 5. This spectrum is identical to that of any pulse component of the composite waveform provided on line 42 and depicted with its component pulses as the equalized playback waveform in FIG. 4.

As discussed above, the phase-locked loop 33 is responsive to the pilot tone to provide system timing recovery. The phase-locked loop 33 acquires and tracks the filtered 13⅓ MHz pilot tone, in the present embodiment, and provides a 40 MHz playback clock which is divided by 2 in a clock divider 43 to obtain the required pulse rate for sampling the analog data signal provided on the line 42. The clock divider 43 is a divide by two circuit for providing the required 20 MHz sampling clock. Since at the beginning of a data interval the phase of the clock divider output is equally likely to have either of two fixed values, a phase reset generator 44 responsive to the sync signal on the line 41 is utilized to remove the phase ambiguity. The phase reset generator sets the clock divider 43 to a predetermined initial state in accordance with either the positive going or negative going zero crossing of the sinusoidal sync signal, in a manner well known to the art.

The equalized playback waveform on the line 42 is applied to a conventional sample and hold circuit 45 which is timed by the output from the clock divider 43. The sample and hold circuit 45 samples the read back waveform at the beginning of each 50 nanosecond interval recurrently at the rate of the ternary data pulses described above and illustrated in FIG. 4. In general the sampling rate is equal to the rate of the L-ary data pulses. Threshold decision devices within the sample and hold circuitry 45 provide, by means of high speed voltage comparators containing latches, a piecewise constant sequence of signals $\{F_i\}$ at the permissible output levels in accordance with the partial response configuration utilized. In the present embodiment the ternary recording input discussed above results in five integer-valued read back levels, viz., 0, ±1, and ±2 in the Class IV partial response signalling design. The sequence $\{F_i\}$ thereby intended to result from the illustrated waveforms of FIG. 4 is designated there as the sampled and held composite waveform. It will be appreciated that the five possible sampled and held levels are via the said thresholding converted into equivalent parallel binary logical representations for further processing before the basic binary data is finally recovered. Thresholding circuits of the type described are commonly utilized in sampled data communication systems. Here, the thresholds are set in a manner well known to yield least likelihood that system noise and distortion can cause the integer valued sequence $\{F_i\}$ to disagree with the result intended by the signalling system design and so cause error in bit recovery.

The output from the sample and hold circuit 45 is applied as an input to a digital decoder circuit 46. For a general L-level system the decoder 46 recreates the originally recorded L-ary data from the intended read back sequence of (2L-1) partial response levels by means of the elementary modulo arithmetic rule specified in the cited U.S. Pat. No. 3,492,578. In the ternary embodiment illustrated, the conversion performed by the decoder 46 is:

$(F_n)$ mod 3 where $F_n$ is the integer-level element in the sequence $\{F_i\}$ that is intended to correspond to the originally recorded data pulse $B_n$ in FIG. 4. The ternary output from the modulo decoder 46, resulting from the exemplary waveforms given in FIG. 4 and having the (−1, 0, +1) modular set of values, is illustrated as the "ternary data output" waveform of the figure. The ternary output of FIG. 4 is, of course in the absence of noise and prohibitive distortion, identical to the ternary input provided by the converter 12 and illustrated in FIG. 4. A modulo decoder of the type utilized is well known in the partial response art and in the present embodiment, provides the ternary output pulses in parallel pair binary representation.

The output from the digital modulo decoder 46 is applied as an input to an L-ary to binary converter 47 which in the present embodiment is implemented as a ternary-to-binary converter. The converter 47 performs the inverse operation to the converter 12 to recover the basic binary data from the storage system as originally provided by the binary data source 11 for bit storage therein. It will be appreciated that circuitry is included within the converter 47 for operating upon sequential pairs of the parallel binary representatives of the ternary data to provide the mapping into corresponding triples of basic binary source data utilizing the mapping function inverse to that employed in the converter 12.

Referring now to FIG. 7, details of the conventional derivative equalizer 36 utilized in the present embodiment of the invention are illustrated. The input to the equalizer 36 from the AGC amplifier 35 is applied through a trimming delay 50 to a multiplier 51 responsive to the coefficient signal D. The input is also applied to a derivative taking circuit 52 which provides a linear phase approximation to the second derivative thereof with respect to time. The output from the derivative circuit 52 is applied through a trimming delay 53 to a multiplier 54 which multiplies the signal by the coefficient E. The output from the derivative circuit 52 is also applied as an input to a derivative circuit 55 (identical to circuit 52) which provides the second derivative with respect to time of the output of the circuit 52. The output of the derivative circuit 55 is applied as an input to a multiplier 56 which receives as its second input the F coefficient signal. The outputs of the multipliers 51, 54 and 56 are applied as inputs to a summing circuit 57 which provides the output of the device. As described above, the transfer function of the derivative equalizer 36 approximates, to within a nearly linear phase vs radian frequency ω:

$$\text{OUTPUT/INPUT} = (D - \omega^2 + F\omega^4)$$

where the coefficients D, E and F are adjusted as described above. The trimming delays 50 and 53 are included to make equal the transmission delays in the three paths of the derivative equalizer so as to prevent phase distortion which would otherwise result therefrom.

Figure 8:
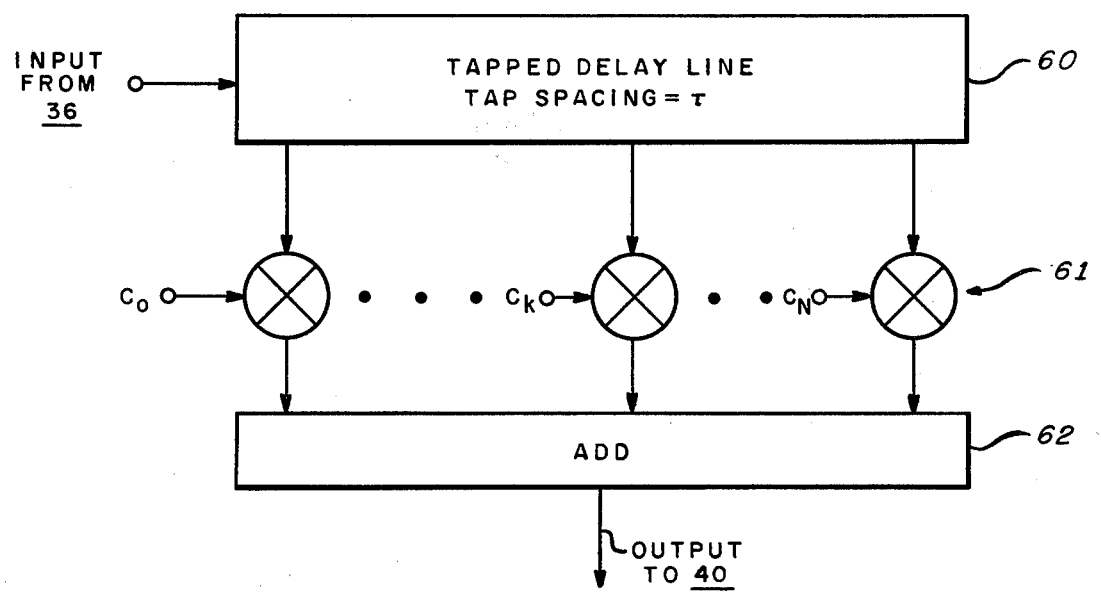
FIG. 8 is a schematic block diagram of the transversal filter of FIG. 2.

Referring now to FIG. 8, details of the transversal filter 37 utilized in the preferred embodiment are illustrated. The input from the derivative equalizer 36 is applied to a tapped delay line 60 having tap spacing equal to $\tau$ which tap spacing is related to the basic pulse interval and bandwidth of the system in a well known manner. The tap outputs from the delay line 60 are applied as inputs to respective multipliers 61 whose respective second inputs receive coefficient signals $C_0$, $C_1 \ldots, C_N$ corresponding to the taps of the line 60. The outputs from the multipliers 61 are combined in a summing circuit 62 which provides the output of the device. The transversal filter 37 has a transfer function as follows:

$$\frac{\text{OUTPUT}}{\text{INPUT}} = \sum_{k=0}^{N} C_k e^{-ik\tau\omega}$$

The transversal filter 37 is tuned by adjusting the values of the coefficients $C_0$ through $C_N$, where in the present example N=25 and $\tau$=25 nanoseconds. Coarse tuning of the filter may be accomplished by adjusting the coefficients for maximum openings in a conventionally displayed eye pattern formed on the equalized playback waveform of FIG. 4. Fine tuning may be achieved by minimizing observed errors in a recovered psuedo random sequence. It will be appreciated that in commercial quality embodiments of the invention the transversal filter 37 may be replaced by a fixed LC or other type of conventional filter designed to have the same characteristics.

Figure 9:
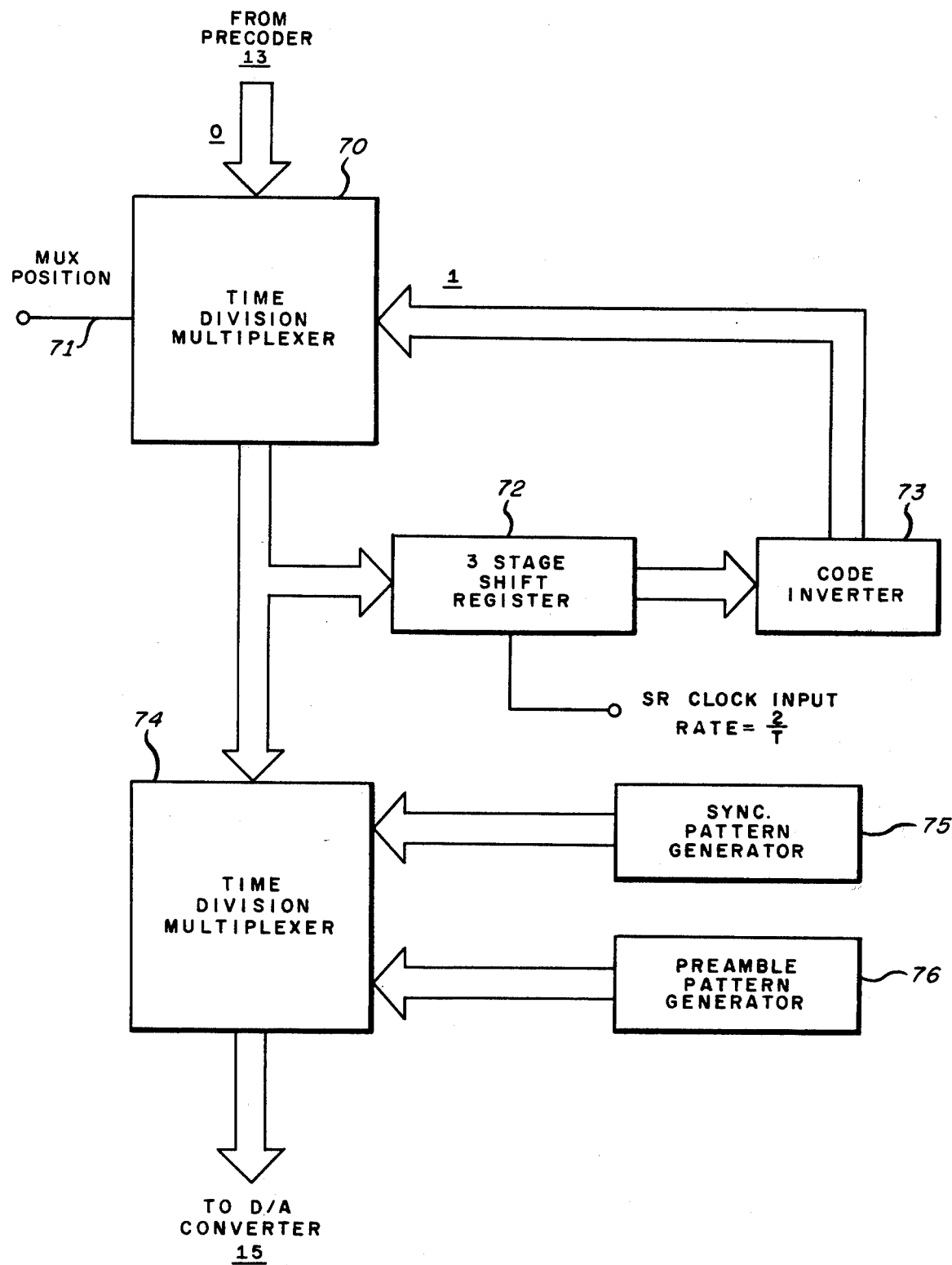
FIG. 9 is a schematic block diagram of the portion of the digital signal formatter of FIG. 1 that generates the interleaved dipulse sequence and formats the data with the sync and preamble signals.
Figure 10:
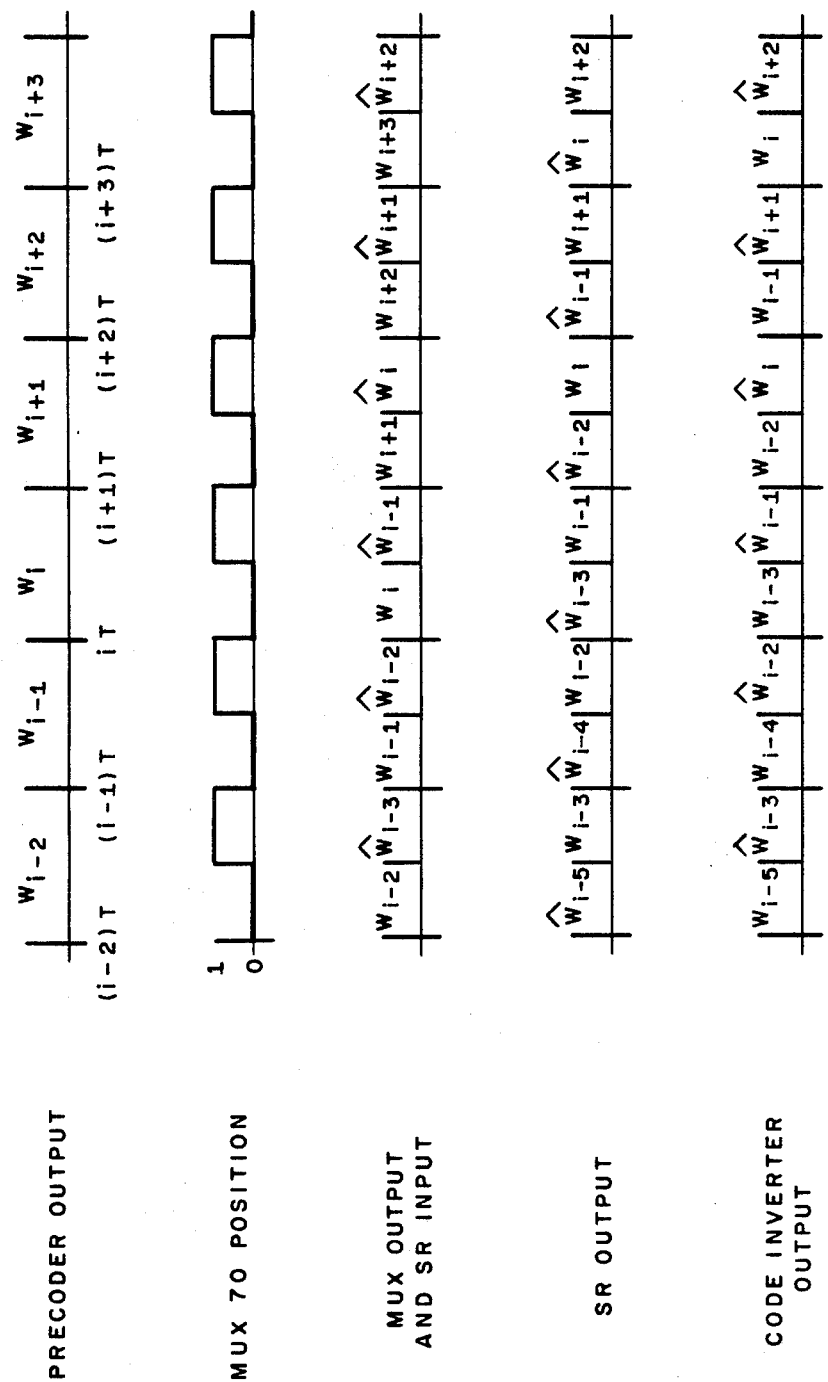
FIG. 10 is a timing diagram of the operation of the circuit of FIG. 9.

Referring now to FIGS. 9 and 10, FIG. 9 illustrates details of the portion of the digital signal formatter 14 utilized in generating the interleaved dipulse sequence and FIG. 10 illustrates the timing with respect to the circuit of FIG. 9. The dipulse generating circuitry of FIG. 9 includes a time division multiplexer 70 having two inputs designated as 0 and 1 which are selectively connected to the output thereof in accordance with a multiplexer (MUX) control signal on a line 71. The MUX position control signal illustrated in FIG. 10 indicates that the inputs 0 and 1 are alternately connected to the output once each pulse interval, which in the above described embodiment is 50 nanoseconds. Thus the 0 input is connected to the output during the first 25 nanoseconds of each interval and the 1 input is connected to the output during the second 25 nanoseconds of the intervals. The output of the precoder 13 is applied to the 0 input and, as discussed above, this signal comprises a pair of binary digits representing the ternary pulses. It will be appreciated that as many parallel binary digits are applied from the precoder 13 to the 0 input of the multiplexer 70 as are required to represent the number of levels in accordance with the L-ary system implemented. These parallel digits may be considered to comprise a word W. The application of sequential words by the precoder 13 is illustrated as the precoder output in FIG. 10.

The parallel binary digit word output from the multiplexer 70 is applied through a three stage parallel shift register array 72 which is clocked at a rate of 2/T, where T is the word interval as indicated in FIG. 10 which in the present embodiment is 50 nanoseconds. Thus the shift register array 72 introduces a delay of 3/2 word intervals which is required for the interleaving of the dipulses as illustrated in FIG. 10. The delayed parallel binary digits from the shift register array 72 is applied to a code inverter 73 which provides the inverse word $\hat{W}$ which is appropriate for providing the inverse polarity portion of the dipulse as discussed above. The output of the code inverter 73 is applied as the 1 input to the multiplexer 70 thereby providing the appropriate command signals to the digital-to-analog converter 15 for generating the interleaved dipulse sequence as described and illustrated above.

Thus $W_k$ provides the code that causes the digital-to-analog converter 15 to generate the proper level and polarity pulse for the first portion of the interleaved dipulse with the code inverter 73 and delay shift register 72 producing $\hat{W}_k$ from $W_k$. $\hat{W}_k$ results in a pulse of the same level as but of opposite polarity to that caused by $W_k$. This, in conjunction with the switching performed by the multiplexer 70, generates the desired interleaving as discussed above and illustrated with respect to FIG. 4.

The interleaved binary word output illustrated as MUX output in FIG. 10 is applied to a second time division multiplexer 74 which combines the sync pattern and preamble pattern therewith as discussed above. The sync pattern and preamble pattern are provided by generators 75 and 76 respectively in a conventional manner. The output of the multiplexer 74 is applied as the input to the digital-to-analog converter 15 to generate the analog recording signals discussed above for recording on the medium.

It is appreciated from the foregoing description of the preferred embodiment of the invention that by utilizing bias to linearize the magnetic interface and by incorporating partial response signalling in the linearized magnetic recording channel a factor of three to four increase in reliable lineal recording density has been achieved as compared to contemporary, state of the art commercial systems currently available. The inventive system has advanced considerably beyond the prior art toward achieving ultimate communication theoretic recording densities. It is believed that the lineal pulse densities achieved would not be reliably obtainable utilizing a partial response format in the absense of the linearizing bias. Additionally, the inclusion of linearizing bias permits the use of multilevel recording which further increases the binary information stored in each recording pulse cell. The bias also provides simultaneous erasure of old data and permits utilization of a pilot tone for timing recovery and gain control. The linearized system further facilitates writeside preemphasis for enhanced signal-to-noise ratio. The partial response format utilizes amplitude threshold sensing in a place of conventional peak-sensing of pulses.

A primary design objective in disk recording is to increase the areal storage density of information bits. This can be achieved by either increasing the number of tracks radially or by increasing the per-track lineal bit density or both. For any given radial track density, it becomes increasingly difficult to improve the lineal density because of the inherent non-linear hysteritic and demagnetization characteristics of conventional saturation recording, resulting in such problems as down stream bit shift and excess loss in peak amplitude. The present invention has significantly overcome these prior art disadvantages by causing the major sources of distortion to be rendered linear, which are correctable by equalization, rather than remaining nonlinear, which can be only partially compensated. The magnetic interface utilized in embodying the invention generally provided a lineal density of approximately 4 kbpi in a prior art instrumentation. Utilizing the invention described above with this interface provided lineal bit densities of approximately 12 to 16 kpbi.

Although the present invention is applicable to any magnetic medium recording system to provide a reliable performance improvement in cost/bit and bits/track-inch, the invention is most advantageously incorporated in the magnetic disk file technology which is currently of preference for computer bulk storage.

The present embodiment has been described in terms of utilizing an interleaved dipulse sequence, but it will be appreciated that other decompositions of the data into other interleaved multipulse types of waveforms may also be utilized for the spectral or other advantages that they afford. It is further appreciated that precoded binary or multilevel data may be directly provided by the digital-to-analog converter 15 for recording within the confines of the partial response format.

It is still further appreciated that the interleaved multipulse sequence signal utilized should possess desirable spectral and/or temporal properties possibly including a frequency spectral null for insertion of a pilot tone.

An alternative embodiment of the present invention may be realized by utilizing run-length-limited code constraints with respect to the written data signal instead of utilizing the pilot tone for timing recovery and gain control. The properties of run-length-limited codes are well known in the art for providing reliable timing recovery and a channel gain measurement irrespective of the original source data. The alternative embodiment may or may not utilize an interleaved dipulse waveform or the like, while remaining within the confines of the partial response format.

Thus it is appreciated that the present invention is not limited to the use of a dipulse sequence. Generally an interleaved multipulse sequence may be utilized for the advantages that the waveforms afford, or no such waveform whatsoever may be utilized. For the purposes of the appended claims the signals flowing in the system are described as pulses. It is appreciated, as discussed above, that in portions of the system these pulses may comprise words (typically conceived as being in parallel groups) of binary digits representative of the pulse amplitudes.

Although the preferred embodiment of the invention has been exemplified as employing Class IV partial response in accordance with U.S. Pat. Nos. 3,388,330 and 3,492,578, it will be appreciated that the invention also applies to embodiments incorporating generalized partial response, a technique known to the art also as matched transmission or modulo transmitter equalization. Generalized partial response employs a precoder of a more general nature than the precoder in the above described embodiment, an example of such decoder being disclosed in the paper by Robert Price, entitled "Nonlinearly Feedback-Equalized PAM vs. Capacity, for Noisy Filter Channels", Proceedings of the 1972 International Conference on Communications, pages 22-12 to 22-17, an IEEE Publication. In other respects, however, the format remains similar to that for the preferred embodiment. Alternatively if no precoder is utilized, the decision circuit of a resulting embodiment should then include a conventional decision feedback equalizer as described, for example, in the said IEEE paper. It will be understood that the precoder, decision circuit and decoder of the present invention therefore may include elements variously suitable to partial response, generalized partial response or matched transmission or decision feedback equalization or combinations of these techniques known to the art.

Without departing from the spirit of the invention, it is appreciated that the partial response data recording herein referred to is characterized by the existence of a null at the Nyquist frequency of the amplitude spectrum of the data read back pulse components of the equalized playback waveform of FIG. 4. The Nyquist frequency is mathematically defined as equal to one-half the pulse rate, and the possession by the data read back pulse of a spectral null at this frequency makes system operation feasible at the minimum Nyquist bandwidth according to FIG. 5 of the aforedescribed preferred embodiment. The minimum Nyquist bandwidth is likewise defined as equal to one-half the pulse rate, but it is known in the art that the partial response signalling herein referred to can also be implemented using bandwidths slightly or substantially in excess of the Nyquist minimum, while still adhering to a null at the Nyquist frequency. Other, excess-bandwidth embodiments of the invention therefore exist which fall within the compass of the invention herein described and in which bias and/or interleaved multipulse operation is employed.

It is appreciated that the herein described partial response format, possessing the above described spectral null at the Nyquist frequency, need not have a spectral null at zero frequency. The spectrum, for example, may include a sinusoidally shaped lobe having maximum amplitude at zero frequency and being generally shaped thereafter as described above. In particular, the spectrum may include more than one spectral null within the minimum Nyquist bandwidth and may have slightly or substantially excess bandwidth as just stated. Thus the terms sinusoidal lobe or sinusoidally shaped lobe includes shapes generally as described above with respect to FIG. 5 as well as shapes having an amplitude maximum at zero frequency.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A high density digital magnetic data storage system for storing digital data represented as data pulse signals, comprising
   recording channel means responsive to said data pulse signals for providing recording signals,
   magnetic interface means having a magnetic recording medium and read and record head means responsive to said recording signals, said head means and said magnetic medium adapted for relative motion with respect to each other for recording said recording signals on said medium,
   reading channel means responsive to said recorded signals for providing read back pulse signals corresponding thereto,
   said recording channel means, magnetic interface means and reading channel means comprising a partial response channel with the amplitude spectrum of said readback pulse signals having a null at the Nyquist frequency,
   bias means for providing a bias signal to said head means for linearizing the recording process with respect to said medium,
   recovery means responsive to said read back signals for providing recovered signals corresponding to said data pulse signals,
   pilot tone generating means in said recording channel means for generating a pilot tone signal,
   means for combining said pilot tone signal with said recording signals for recording on said medium,
   pilot tone recovery means in said reading channel means responsive to said head means for recovering said recorded pilot tone,
   envelope detector means responsive to said recovered pilot tone for providing a signal in accordance with the envelope thereof, and
   gain control means responsive to said envelope signal for adjusting the gain of said reading channel means in accordance with said envelope signal, thereby gain stabilizing said system.

2. The system of claim 1 in which said reading channel means further includes timing means responsive to said recovered pilot tone for providing a timing signal accordance therewith.

3. The system of claim 2 in which said timing means comprises phase locked loop means.

4. The system of claim 2 in which said recovery means includes
   sampling circuit means responsive to said read back pulse signals and said timing signal for amplitude sampling said read back pulse signals in accordance with said timing signal thereby providing an amplitude sample signal, and
   decision circuit means responsive to said amplitude sample signal for providing said recovered signals in accordance therewith.

5. The system of claim 1 in which said bias means comprises means for providing said bias signal to said head means for erasing previously recorded data simultaneously with recording said recording signals.

6. The system of claim 1 in which said recording channel means and said reading channel means include means for shaping the transfer function of said partial response channel.

7. The system of claim 1 in which said recording channel means includes means for shaping the transfer function of said partial response channel and frequency preemphasis means for enhancing the signal to noise ratio of said recording signal flowing through said channel.

8. The system of claim 1 in which said recording channel means, magnetic interface means and reading channel means comprise said partial response channel with said amplitude spectrum of said read back pulse signals having at least one sinusoidally shaped lobe.

9. The system of claim 1 in which said recording channel means, magnetic interface means and reading channel means comprise a Class IV partial response channel.

10. The system of claim 1 in which said recording channel means further includes code converter means responsive to said data pulse signals for converting said data pulse signals into run length limited code signals for use in said recording channel to provide said recording signals.

11. The system of claim 1 in which said gain control means comprises means responsive to said envelope signal for adjusting the gain of said reading channel means in accordance with a function of said envelope signal.

12. The system of claim 11 in which said gain control means comprises means for adjusting the gain of said reading channel means in accordance with a power law function of said envelope signal.

13. The system of claim 12 in which said gain control means comprises means for adjusting the gain of said reading channel means in accordance with a power law function of said envelope signal, wherein said envelope signal is raised to a power proportional to the ratio of the frequency of said pilot tone signal to the center frequency of said amplitude spectrum of said readback pulse signal.

14. The system of claim 13 in which said gain control means comprises means for adjusting the gain of said reading channel means inversely as said power law function of said envelope signal.

15. The system of claim 1 in which said recording channel means includes interleaved dipulse generating means responsive to said data pulse signals for providing an interleaved dipulse sequence signal corresponding to said data pulse signals for providing said recording signals, said interleaved dipulse sequence signal having a frequency spectral null.

16. The system of claim 1 in which said recording channel means includes interleaved dipulse generating means responsive to said data pulse signals for providing an interleaved dipulse sequence signal corresponding to said data pulse signals for providing said recording signals, said interleaved dipulse sequence signal having a frequency spectral null for insertion of said pilot tone signal.

17. The system of claim 15 or 16 in which said interleaved dipulse generating means comprises means for decomposing each said data pulse into a pair of spaced apart subpulses, one said subpulse having a magnitude and polarity corresponding to said data pulse and the other said subpulse having the same magnitude and a polarity opposite said data pulse, thereby generating an interleaved dipulse, and means for interleaving said dipulses to provide said interleaved dipulse sequence signal.

18. The system of claim 15 or 16 in which said data pulses occur in respective data intervals and said interleaved dipulse generating means comprises means for decomposing each said data pulse into a pair of spaced apart subpulses, one said subpulse having a magnitude and polarity in accordance with the magnitude and polarity of said data pulse and the other said subpulse having the same magnitude and a polarity opposite said data pulse, one of said subpulses occurring in the first half of the data interval corresponding to said data pulse and the other of said subpulses occurring in the second half of the data interval following the data interval corresponding to said data pulse, thereby generating an interleaved dipulse, and means for interleaving said dipulses to provide said interleaved dipulse sequence signal.

19. The system of claim 1 in which said recording channel means includes precoding means responsive to said data pulse signals for precoding said data pulse signals in accordance with a suitable precoding rule, said precoded data pulse signals being utilized in said recording channel means for providing said recording signals.

20. The system of claim 19 in which said recovery means comprises sampling means responsive to said read back pulse signals for amplitude sampling said read back pulse signals at predetermined intervals thereby providing an amplitude sample signal, and decision and decoding circuit means responsive to said amplitude sample signal for providing said recovered signals in accordance therewith.

21. The system of claim 19 in which said recovery means comprises sampling means responsive to said read back pulse signals for amplitude sampling said read back pulse signals at predetermined intervals thereby providing an amplitude sample signal, decision circuit means responsive to said amplitude sample signal for providing a quantized sample signal corresponding thereto in accordance with predetermined thresholds, and decoding circuit means responsive to said quantized sample signal for providing said recovered signals in accordance with a suitable decoding rule.

22. The system of claim 21 in which said precoding means comprises means for precoding said data pulse signals in accordance with a modulo arithmetic combination rule suitable for partial response data recording, and said decoding circuit means comprises means for providing said recovered signal in accordance with a modulo arithmetic decoding rule suitable for partial response data recording.

23. The system of claim 19 in which said data pulse signals comprise a pulse train of data pulses having a plurality L of amplitude levels and said precoding means comprises means for precoding said data pulse signals in accordance with a modulo-L arithmetic combination rule suitable for partial response data recording.

24. The system of claim 1 in which said recovery means comprises sampling means responsive to said read back pulse signals for amplitude sampling said read back pulse signals at predetermined intervals thereby providing an amplitude sample signal, and decision circuit means responsive to said amplitude sample signal for providing said recovered signals in accordance therewith.

25. The system of claim 24 in which said decision circuit means comprises means for providing said recovered signals in accordance with predetermined thresholds.

26. The system of claim 24, 23 or 25 in which said data pulse signals comprise a pulse train of data pulses having a plurality L of amplitude levels and said recovery means includes means for providing said recovered signals in accordance with a modulo-L arithmetic decoding rule suitable for partial response data recording.

27. The system of claim 1 in which said data pulse signals comprise a pulse train of binary amplitude data pulses and said recording channel means includes binary-to-multilevel converter means responsive to said binary amplitude pulse train for providing signals representing a corresponding pulse train of multilevel amplitude pulses, said multilevel amplitude pulse train signals being utilized in said recording channel means for providing said recording signals.

28. The system of claim 27 in which said recovery means comprises sampling means responsive to said read back pulse signals for amplitude sampling said read back pulse signals at predetermined intervals thereby providing an amplitude sample signal, decision circuit means responsive to said amplitude sample signal for providing recovered multilevel signals corresponding to said multilevel amplitude pulse train, and multilevel to binary converter means responsive to said recovered multilevel signals for providing recovered binary level signals corresponding to said binary amplitude data pulse train.

29. The system of claim 27 in which said binary-to-multilevel converter means comprises means for providing said multilevel amplitude pulse train signals as groups of binary amplitude pulse signals, each said group being representative of a multilevel amplitude pulse.

30. The system of claim 29 in which said recording channel means includes precoding means responsive to said groups of binary amplitude pulse signals representative of said multilevel amplitude pulse train for precoding said signals in accordance with a combination thereof, thereby providing further groups of binary amplitude pulse signals representative of said combination for use in providing said recording signal.

31. The system of claim 29 in which said recording channel means includes interleaved dipulse generating means responsive to said groups of binary amplitude pulse signals for providing an interleaved dipulse sequence signal corresponding thereto, said interleaved dipulse sequence signal providing said recording signals, said interleaved dipulse sequence signal having a frequency spectral null, said interleaved dipulse sequence signal bearing an amplitude correspondence to said multilevel amplitude pulse train signal.

32. The system of claim 29 in which said recording channel means includes precoding means interposed between said binary-to-multilevel converter means and said interleaved dipulse generating means and responsive to said group of binary amplitude pulse signals representative of said multilevel amplitude pulse train for precoding said multilevel amplitude pulses by forming combinations of said groups of binary amplitude pulses, thereby providing groups of precoded binary amplitude pulse signals to said interleaved dipulse generating means.

33. The system of claim 31 or 32 in which said interleaved dipulse generating means includes digital-to-analog converter means responsive to said groups of binary amplitude pulse signals for providing said interleaved dipulse sequence signal.

34. The system of claim 27 in which said recording channel means includes interleaved dipulse generating means responsive to said multilevel amplitude pulse signals for providing an interleaved dipulse sequence signal corresponding thereto, said interleaved dipulse sequence signal providing said recording signals and said interleaved dipulse sequence signal having a frequency spectral null.

35. The system of claim 27 in which said recording channel means includes interleaved dipulse generating means responsive to said multilevel amplitude pulse signals for providing an interleaved dipulse sequence signal corresponding thereto, said interleaved dipulse sequence signal providing said recording signals and said interleaved dipulse sequence signal having a frequency spectral null for insertion of said pilot tone signal.

36. The system of claim 34 or 35 in which said interleaved dipulse generating means comprises
means for decomposing each said multilevel amplitude pulse into a pair of spaced apart subpulses, one said subpulse having a magnitude and polarity corresponding to said multilevel amplitude pulse and the other said subpulse having the same magnitude and a polarity opposite said multilevel amplitude pulse,
thereby generating an interleaved dipulse, and
means for interleaving said dipulses to provide said interleaved dipulse sequence signal.

37. The system of claim 34 or 35 in which said multilevel amplitude pulses occur in respective intervals and said interleaved dipulse generating means comprises
means for decomposing each said multilevel amplitude pulse into a pair of spaced apart subpulses, one said subpulse having a magnitude and polarity in accordance with the magnitude and polarity of said multilevel amplitude pulse and the other said subpulse having the same magnitude and a polarity opposite said multilevel amplitude pulse, one of said subpulses occurring in the first half of the interval corresponding to said multilevel amplitude pulse and the other of said subpulses occurring in the second half of the interval following the interval corresponding to said multilevel amplitude pulse,
thereby generating an interleaved dipulse, and
means for interleaving said dipulses to provide said interleaved dipulse sequence signal.

38. A high density digital magnetic data storage system for storing digital data represented as data pulse signals, comprising
recording channel means responsive to said data pulse signals for providing recording signals,
magnetic interface means having a magnetic recording medium and read and record head means responsive to said recording signals, said head means and said magnetic medium adapted for relative motion with respect to each other for recording said recording signals on said medium,
reading channel means responsive to said recorded signals for providing read back pulse signals corresponding thereto,
said recording channel means, magnetic interface means and reading channel means comprising a partial response channel with the amplitude spectrum of said readback pulse signals having a null at the Nyquist frequency,
bias means for providing a bias signal to said head means for linearizing the recording process with respect to said medium,
recovery means responsive to said readback signals for providing recovered signals corresponding to said data pulse signals, and
interleaved dipulse generating means in said recording channel means responsive to said data pulse signals for providing an interleaved dipulse sequence signal corresponding to said data pulse signals for providing said recording signals, said interleaved dipulse sequence signal having a frequency spectral null.

39. The system of claim 38 in which said interleaved dipulse generating means comprises
means for decomposing each said data pulse into a pair of spaced apart subpulses, one said subpulse having a magnitude and polarity corresponding to said data pulse and the other said subpulse having the same magnitude and a polarity opposite said data pulse,
thereby generating an interleaved dipulse, and
means for interleaving said dipulses to provide said interleaved dipulse sequence signal.

40. The system of claim 38 in which said data pulses occur in respective data intervals and said interleaved dipulse generating means comprises
means for decomposing each said data pulse into a pair of spaced apart subpulses, one said subpulse having a magnitude and polarity in accordance with the magnitude and polarity of said data pulse and the other said subpulse having the same magnitude and a polarity opposite said data pulse, one of said subpulses occurring in the first half of the data interval corresponding to said data pulse and the other of said subpulses occurring in the second half of the data interval following the data interval corresponding to said data pulse,
thereby generating an interleaved dipulse, and means for interleaving said dipulses to provide said interleaved dipulse sequence signals.

41. The system of claim 38 in which said data pulse signals comprise a pulse train of binary amplitude data pulses and said recording channel means includes binary-to-multilevel converter means responsive to said binary amplitude pulse train for providing signals representing a corresponding pulse train of multilevel amplitude pulses, said multilevel amplitude pulse train signals being utilized in said recording channel means for providing said recording signals.

42. The system of claim 41 in which said recording channel means includes interleaved dipulse generating means responsive to said multilevel amplitude pulse signals for providing an interleaved dipulse sequence signal corresponding thereto, said interleaved dipulse sequence signal providing said recording signals and said interleaved dipulse sequence signal having a frequency spectral null.

43. The system of claim 42 in which said interleaved dipulse generating means comprises means for decomposing each said multilevel amplitude pulse into a pair of spaced apart subpulses, one said subpulse having a magnitude and polarity corresponding to said multilevel amplitude pulse and the other said subpulse having the same magnitude and a polarity opposite said multilevel amplitude pulse, thereby generating an interleaved dipulse, and means for interleaving said dipulses to provide said interleaved dipulse sequence signal.

44. The system of claim 42 in which said multilevel amplitude pulses occur in respective intervals and said interleaved dipulse generating means comprises means for decomposing each said multilevel amplitude pulse into a pair of spaced apart subpulses, one said subpulse having a magnitude and polarity in accordance with the magnitude and polarity of said multilevel amplitude pulse and the other said subpulse having the same magnitude and a polarity opposite said multilevel amplitude pulse, one of said subpulses occurring in the first half of the interval corresponding to said multilevel amplitude pulse and the other of said subpulses occurring in the second half of the interval following the interval corresponding to said multilevel amplitude pulse, thereby generating an interleaved dipulse, and means for interleaving said dipulses to provide said interleaved dipulse sequence signal.

* * * * *